UNITED STATES PATENT OFFICE.

REINHOLD HOFFMAN, OF MARIENBERG, GERMANY.

IMPROVEMENT IN MANUFACTURE OF ULTRAMARINE COLORS.

Specification forming part of Letters Patent No. 202,822, dated April 23, 1878; application filed February 1, 1878.

*To all whom it may concern:*

Be it known that I, REINHOLD HOFFMAN, of Marienberg, near Bensheim, in the Grand Duchy of Hessen, in the Empire of Germany, have invented an Improved Process for the Manufacture of Red and Violet Ultramarine; and I hereby declare that the following is a full, clear, and exact description of the same.

The invention consists in the transformation of blue or green, or of the so-called "white ultramarine," or of mixtures of the same, in a heightened temperature and through the action of certain acids or the actions of such matters or mixtures herein specified as are able to produce such acids, or acid vapors or gases, at first into violet, and, by further progressive action, into red pigments, which are well adapted to use in the arts.

The transformations take place successively, and the violet colors are properly to be considered only as intermediate products, or as mixtures of blue and red ultramarine, which can therefore be produced in an unlimited number of shades between blue and red. The red colors can also be produced in lighter or darker shades, according to the intensity of the chemical reaction, the height of the temperature, or the physical condition of the ultramarine previous to the treatment to which it is subjected in the process. The said transformations are brought about, under the conditions and in the manner hereinafter specified, by the use of hydrochloric acid, hydrobromic acid, hydroiodic acid, or salts, or mixtures of salts, which, when used under the conditions hereinafter named, develop the said acids.

In carrying out my improved process, I heat the blue or white ultramarine, or mixtures of the same, to a temperature of from 120° Celsius to 200° Celsius, and then subject them to the action of vapors of one or more of the above-named acids till the desired shade of violet is attained. The said acids may be used as they are obtained in commerce; or they may, as hereinbefore stated, be derived directly from such salts or substances as will, when heated, in contact with ultramarine, develop the said acids. In the latter case, the said salts or substances may be, previous to the heating, mixed with the ultramarine, to be treated in the right quantity or proportion to furnish a sufficient quantity of acid, as hereinafter described.

The admission of air in no wise obstructs, but, on the contrary, rather aids, the transformation, acting either as a means of oxidation or as a means of diluting the acid vapors, or perhaps acting in other ways not yet explained, but which assist the transformation.

There are several modifications of the procedure in effecting the transformation; but they all involve the same general principles. Of these modified courses of procedure I find the following to be very efficient.

The said modifications are applicable according as the blue and white ultramarine are used separately or together, and according as the said acids, or the salts or substances from which the free acids are obtained, are used separately or together.

In one way of proceeding for the production of violet ultramarine, I mix intense-colored blue ultramarine with from two to five per cent. of its weight of sal-ammoniac, and heat this mixture in any furnace of ordinary construction which will permit the free access of air to the mixture during the heating. I heat the mixture to a temperature of about 200° Celsius, and keep it at this temperature, stirring frequently, until the desired shade is obtained, which determines the duration of the operation. The said shade approaches more or less to red, according to the length and intensity of the chemical reaction and the degree of temperature maintained during the operation. When the desired tint is reached I cool off the mixture. According as the said mixture is cooled slowly or rapidly, the brilliancy of the product is affected, slow cooling heightening the brilliancy, and vice versa. The said cooling, therefore, is not conducted according to any rule or formula, but is hastened or protracted, according to the desire and design of the manufacturer. The next step is to wash out the mixture thoroughly with water to remove the soluble salts. Finally, by drying and pulverizing the product by any of the well-known methods, the said violet ultramarine is fitted for commerce and for use in the arts.

The varying proportions between the two extreme proportions of sal-ammoniac named will, in large measure, determine the shade of the ultimately-acquired product; and as these tints, in their great variety, cannot be specified, they must be left to the taste, judgment, and desire of the manufacturer.

In another way of carrying out my invention, and for the production of red ultramarine, I use the violet ultramarine, obtained as above, or any other violet ultramarine, and heat the same in any suitable furnace to about 150° Celsius; and, while so heated and frequently stirred, I direct the vapors of hydrochloric acid over and upon the same till the desired shade of red has been attained. It will be obvious that the length of time required for the operation and the amount of hydrochloric acid employed will vary according to the shade of red required; and as this may vary according to the taste and desire of the manufacturer, no precise rule for time and proportion of acid can be given. The operation is to be stopped when, upon examination, the shade desired is obtained. The product must then be washed, dried, and pulverized, as hereinbefore described.

In another modification of procedure I produce red ultramarine from blue ultramarine, said ultramarine so produced being of the same kind as that produced from violet ultramarine, in the manner hereinbefore described. For this purpose I heat the blue ultramarine to about 150° Celsius, and then treat it with vapors of hydrochloric acid, in the same way as that described for the production of red from violet ultramarine. In this method of proceeding blue is first converted into violet, and then violet is, by the continuation of the treatment, converted into red ultramarine. The shade obtained depends mainly upon the duration of the process. If the latter be interrupted at the right time violet ultramarine is obtained. The further treatment—that is to say, the washing, grinding, &c.—is the same as that described for the production of violet ultramarine. Violet ultramarine may also be obtained by mixing red ultramarine, produced as described, with blue ultramarine which has not been treated according to the process herein described.

The chemical reaction in the production of red ultramarine from blue, as herein described, is quite similar to that in the formation of blue from green ultramarine, or of green from the so-called white ultramarine. At each of these transformations of the ultramarine sodium is extracted, coming out as a salt, and at the same time the chemical affinity of sulphur is changed.

It will be seen that the acids by which these changes are effected in my herein-described process are derived from that class of chemical elements known as halogens. All of these acids act similarly when brought into contact with ultramarine under the conditions specified.

I claim—

The process of manufacturing violet and red ultramarine, herein described, consisting in exposing the blue or (so-called) white ultramarine, or mixtures of the same, while heated, substantially as herein stated, to the action of the vapors of acids derived from the halogen group of elements, and afterward washing out the soluble salts, substantially as and for the purpose specified.

DR. REINHOLD HOFFMAN.

Witnesses:
  PETER BARTHEL,
  LOUIS BASSE.